Oct. 11, 1955     G. E. MUSEBECK ET AL     2,720,137
LINKED BELT SLIDE PROJECTOR
Filed April 6, 1953     2 Sheets-Sheet 1
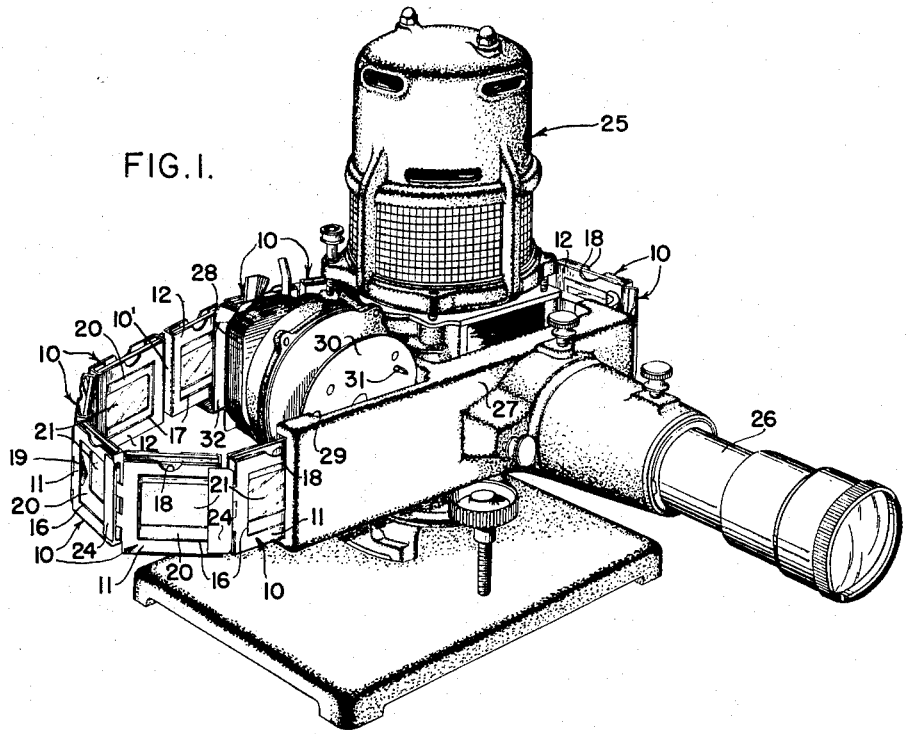
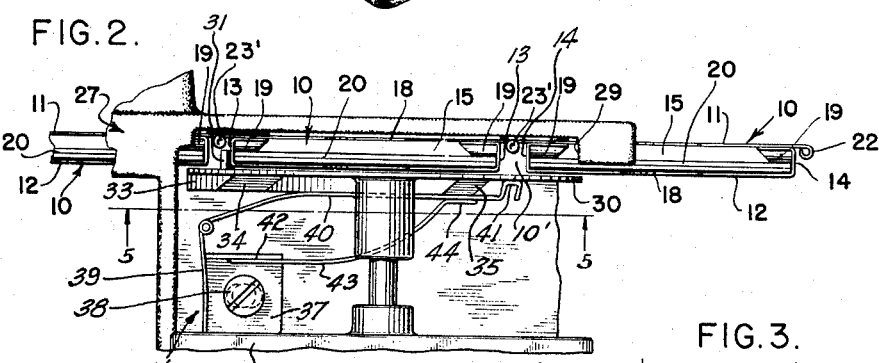
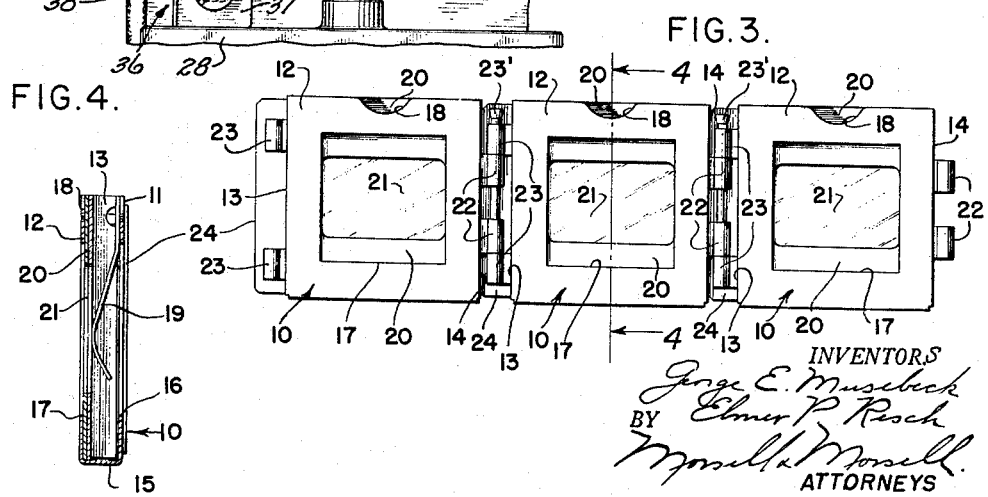
INVENTORS
George E. Musebeck
Elmer P. Resch
BY
Morsell & Morsell
ATTORNEYS Oct. 11, 1955

G. E. MUSEBECK ET AL 2,720,137

LINKED BELT SLIDE PROJECTOR

Filed April 6, 1953

United States Patent Office 2,720,137
Patented Oct. 11, 1955

2,720,137

LINKED BELT SLIDE PROJECTOR

George E. Musebeck and Elmer P. Resch, Oconomowoc, Wis., assignors to Picture Recording Company, Oconomowoc, Wis., a corporation of Illinois Application April 6, 1953, Serial No. 346,852

5 Claims. (Cl. 88—28)

This invention relates to improvements in projector slide holders and drive mechanism therefor.

A general object of the present invention is to provide a new combination including an improved slide holding belt and a projector adapted to receive said belt, said projector having novel power operated means cooperable with said belt to successively advance said slide holders through said projector.

A further object of the invention is to provide an improved slide holder which is adapted to readily removably accommodate various well known types of slides or slide mountings.

A further object of the invention is to provide an improved slide holder which is adapted to be connected to any desired number of similar holders to form a belt of a type which may be either endless for continuous or repeated exposure, or non-endless for coiling on reels or turntables.

A more specific object of the invention is to provide an improved slide holder wherein each end is formed with a hinge element which is adapted to be pivotally connected to a hinge element of a like adjacent holder, said hinge elements being so constructed and positioned that a belt formed from a plurality of the improved holders has a plurality of spaced transverse grooves in one face, each groove being positioned between a pair of adjacent holders.

A further object of the invention is to provide an improved slide holder of the class described and including a flange projecting from one end and overlapping the hinge element, said flange serving to prevent the passage of light through the hinge connection between adjacent holders.

A further specific object of the invention is to provide an improved projector drive mechanism which is cooperable with the improved slide holder belt, said mechanism including an eccentric pin mounted for rotary movement in a circular path into and out of successive transverse grooves of the belt, said belt being advanced the length of one slide holder each time the pin describes a complete circle.

A further object of the invention is to provide a drive mechanism as above described which includes locking means, preferably a locking finger engageable with a groove, for positively preventing accidental movement of the slide holding belt while the eccentric pin is moving from the upper end of one transverse groove toward the upper end of the next transverse groove. Thus, accurate entry, without jamming, of the pin into a new groove is insured.

A further object of the invention is to provide an improved drive mechanism as above described wherein the pin becomes disengaged from the belt during each revolution to permit selective manual adjustment of the position of the slide holding belt, providing the belt locking means is first manually disengaged.

A further object of the invention is to provide an improved slide holder and drive mechanism which is simple and inexpensive in construction, efficient in operation, and otherwise well adapted for the purposes described.

With the above and other objects in view, the invention consists of the improved projector slide holder and drive mechanism therefor, and all of the parts and combinations thereof as set forth in the claims, and all equivalents thereof.

In the drawing accompanying and forming a part of this specification, wherein one complete embodiment of the preferred form of the invention is shown, and wherein like characters of reference indicate the same parts in all of the views:

Fig. 1 is a perspective view of a projector constructed in accordance with the invention, and having a slide holding belt operatively positioned therein;

Fig. 2 is an enlarged fragmentary plan view of a portion of the projector of Fig. 1 showing the drive mechanism coacting with the belt as viewed from above and rearwardly of the projector;

Fig. 3 is a rear elevational view showing three of the improved slide holders hingedly interconnected and with slides positioned therein;

Fig. 4 is a vertical sectional view through one of the improved slide holders, taken along the line 4—4 of Fig. 3;

Figure 5:
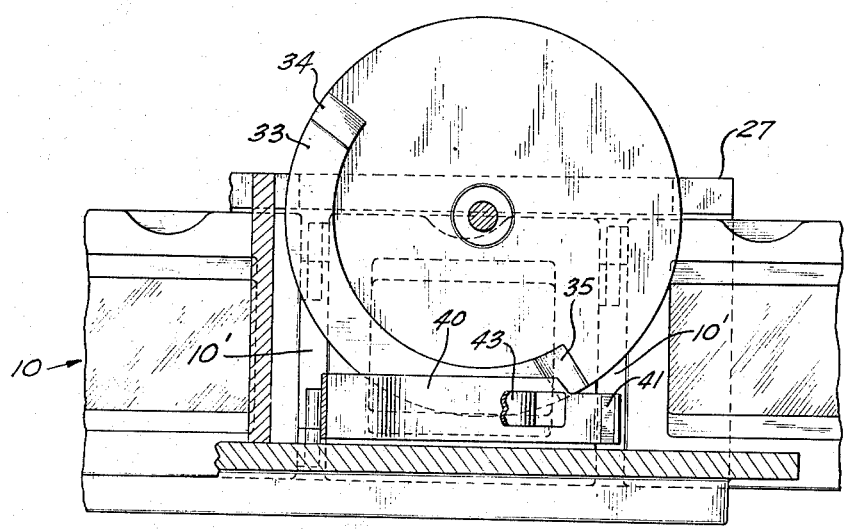
Fig. 5 is a fragmentary sectional view taken approximately on the line 5—5 of Fig. 2.

Referring now to Figs. 2 to 4, the numerals 10 indicate individual slide holders constructed in accordance with the invention. Each holder 10 has parallel front and rear walls 11 and 12 and parallel, relatively narrow end walls 13 and 14. Each holder also has an open top and a bottom wall 15. As shown most clearly in Fig. 4, the front and rear walls 11 and 12 have alined rectangular apertures 16 and 17 respectively. The top edges of walls 11 and 12 are preferably cut away, as at 18 (Fig. 4).

Anchored on an upper portion of the inner surface of front wall 11 on each side of aperture 16 is an arcuate, downwardly extending leaf spring 19 which curves toward and then away from the rear wall 12, as shown in Fig. 4. Each holder 10 is adapted to receive and hold a slide 20 which may be inserted through the open top of the holder. The springs 19 frictionally engage the slides to urge the latter against the rear wall 12. The apertures 16 and 17 are preferably larger than the slide film area 21 carrying the image to be projected. The walls 11 and 12 are spaced sufficiently far apart so that a slide utilizing any conventional type of mounting can be accommodated in the holder 10, such as glass, paper, or aluminum mounted slides or the "ready mount" type. The cut-away portions 18 make the slide 20 readily accessible for manual removal from the holder 10.

Referring to Figs. 2 and 3, each holder 10 has spaced coaxial hinge elements 22 which project from one end of the front wall 11. Other coaxial hinge elements 23 project from the opposite end of said front wall 11. The elements 23 are so spaced that the elements 22 of an adjacent holder can be positioned coaxially therebetween as shown in Fig. 3. Removable hinge pins 23' pivotally connect the elements 22 and 23 of adjacent holders 10, as shown. Any desired number of holders 10 may be detachably connected in the manner described to form a belt. If desired, the belt may be endless, as shown in Fig. 1. By having the hinge elements 22 and 23 relatively small and close to the front wall, and by having them project from the ends of each slide holder as shown, relatively deep and wide grooves 10' as shown in Figs. 1 and 2 are formed between the adjacent slide holders 10, which grooves are accessible from the inner side of the belt. These grooves are bounded by shoulders which are formed by the ends 13 and 14 of the slide holders.

Each holder 10 has a flange 24 which projects from the front wall 11 and overlaps the hinge elements 23. The flange 24 has substantially the same height as the front and rear walls 11 and 12, and has a width sufficient to overlap the front face 11 of the adjacent connected holder 10 to form a light seal between the adjacent holders when the latter are in the straight line arrangement shown in Fig. 3.

Referring now to Fig. 1, the numeral 25 indicates a projector constructed to accommodate a belt made up of the improved holders 10. The projector 25 has the usual lamp (not shown) and scope 26 in front of the lamp. At the rear end of scope 26 the projector has a transversely extending rectangular guide member 27 of a size to longitudinally slidably receive a belt formed of the holders 10, as shown in Fig. 2. The holders 10 are adapted to be successively positioned at the rear end of scope 26 so that the slides are illuminated by the lamp (not shown) which, in turn, causes the image on said slides to be projected through the scope.

Positioned behind the guide 27 and laterally offset from the scope 26 is a motor 28, preferably having a built-in speed reduction unit. The guide 27 has its rear and top walls cut away in front of the motor 28, as at 29, and fixedly mounted on the shaft of motor 28 is a disc 30. An eccentric pin 31 is fixed to and projects from the front surface of disc 30 toward guide 27. The pin 31 is smaller in diameter than the width of the grooves 10' which are formed between adjacent end walls 13 and 14, and said pin is adapted to coact with said grooves 10' during rotation of the disc 30 to advance the belt.

Secured to the back of the disc and extending part way around the disc on the back thereof is a cam surface 33 (see Figs. 2 and 5) which cam surface has an incline 34 leading from the main surface of the back of the disc to one of its ends, and a similar incline 35 leading back to the main surface of the back of the disc from its other end. The cam surface 33 may be all of the same height.

Figure 6:
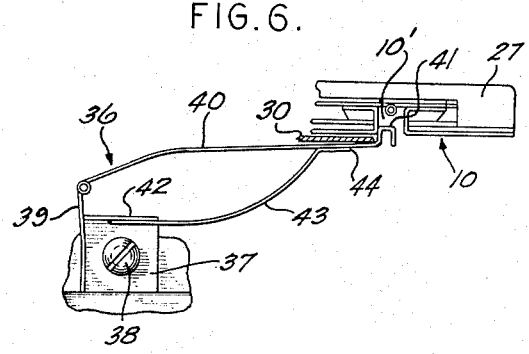
Fig. 6 is a fragmentary plan view of the locking clip showing fragments of the machine in association therewith.

Mounted on the projecting frame between the motor 28 and disc 30 is a locking clip which is designated generally by the numeral 36. This locking clip includes a supporting bracket 37 which is secured to the projector frame by a screw 38. The bracket 37 has one edge flanged upwardly as at 39 and projecting beyond the bracket toward the rotary disc 30. Hinged to the outer end of the flange 39 is a finger 40 having a latching end 41 projecting at substantially right angles therefrom. This latching end 41 may be formed by a U-shaped bend as indicated in Fig. 6, the U being of such width as to be readily engageable in one of the grooves 10' of the slide holding belt as is shown in Fig. 6 to temporarily lock the belt against progressive movement. The bracket portion 37 may also have an upwardly bent front flange 42 to which a band spring 43 may be secured. The other end of the spring 43 is secured to the locking finger 40 as at 44 to normally urge the locking finger toward the endless slide holding belt.

In operation of the projector 25, a belt of the improved holders 10, having slides 20 therein, is inserted in the tubular guide 27 while the pin 31 is above the guideway. The first slide to be projected is pulled into registration with the scope 26. In Fig. 2, the slide which is in registration with scope 26 is shown at the left of pin 31, whereas the holder at the right of pin 31 may contain the last slide of a series which is carried by the endless belt.

The eccentricity of the pin 31 and the position of disc 30 is such that as the disc is rotated, pin 31 moves downwardly into the open end of a groove 10' and engages the end wall 13 of the adjacent holder, as shown. Continued rotation of the disc 30 moves the belt a distance equal to the spacing between the end walls 13 of adjacent holders as the pin moves downwardly and thence upwardly in its circular path. After each such movement the pin travels upwardly out of a groove as the next holder 10 in the series is moved into registration with scope 26, and as the disc 30 continues to rotate, the pin 31 soon engages the next groove 10'. When stopping the machine, if the disc 30 is stopped while the pin 31 is above the guideway 27, as shown in Fig. 1, then, if the locking clip 36 is first released, the belt may be manually adjusted if desired so that certain slides can be skipped. As the belt is advanced through the guide 27, the overlapping flanges 24 prevent any light from leaking through the hinged area between successive holders when said areas are being moved past the scope 26.

While the pin 31 is moving from the top of one of the grooves 10' and toward the position in which it is shown in Fig. 1, it is important that the slide holding belt be held against movement. If any movement should accidentally take place it is possible that the pin 31, moving downwardly from the position of Fig. 1 toward the top of the next groove 10' might miss the groove by a slight amount and jam on top of one of the slide holders. This would, of course, be undesirable and might damage the mechanism. With the present invention, however, as the pin 31 moves from the position of Fig. 1 into the upper end of a groove 10' the cam arrives at the position of Figs. 2 and 5 to pull the latching end 41 of the finger 40 against the tension of the spring 43, from the locking position of Fig. 6 to the released position of Fig. 2. Thus, just before the pin starts to drive the slide holding belt, the latch is released to permit movement. During all of the time that the pin is driving the slide holding belt the finger 40 is riding on the cam surface 33 keeping the slide holding belt unlocked. As soon as the pin 31 leaves the upper end of a slot 10' then the cam surface 33 leaves the finger 40 allowing the spring 43 to snap the finger into the groove 10' as shown in Fig. 6 to lock the slide holder in a definite position so that as the pin 31 progresses through the upper arc of its travel, accurate entry, without jamming, into the next slot 10' is insured.

When the holders 10 are connected to form an endless belt, the slides can be automatically shown in sequence and repeated continuously. The projector 25 is provided with a bracket 32 opposite the scope 26 for supporting the rear portion of an endless belt of holders.

Any desired number of holders can be hinged together, and any suitable means may be used to support the belt. For example, where a relatively large number of holders are used, the ends of the belt may be coiled and supported on a pair of turntables (not shown), said turntables being rotated due to the movement of the belt through the projector 25.

Various changes and modifications may be made without departing from the spirit of the invention, and all of such changes are contemplated, as may come within the scope of the claims.

What we claim is:

1. In combination: a projector having a light source; an elongated belt having a plurality of equally longitudinally spaced apertured slide-carrying pockets, said belt also having in one face and between each pair of pockets a transversely extending groove having at least one end open; a transverse guideway on said projector in front of said light source adapted to longitudinally slidably receive said belt; a rotatable element mounted adjacent said guideway for rotation on an axis normal to said guideway and transversely offset therefrom adjacent open ends of said grooves; and an eccentric pin carried by said rotatable element and projecting toward said guideway, said pin being so positioned that rotation of said rotatable element causes said pin to move into and out of successive transverse belt grooves through open ends thereof to advance said belt longitudinally and thereby move successive slide-carrying pockets in front of said light source.

2. In combination: a projector having a light source; an elongated belt having a plurality of equally longitudinally spaced apertured slide-carrying pockets, said belt also having in one face and between each pair of pockets a transversely extending groove having at least one end open; a transverse guideway on said projector in front of said light source adapted to longitudinally slidably receive said belt; a rotatable disk mounted adjacent said guideway for rotation on an axis normal to said guideway and transversely offset therefrom adjacent open ends of said grooves; and an eccentric pin carried by said rotatable disk and projecting toward said guideway, said pin being so positioned that rotation of said rotatable disk causes said pin to move into and out of successive transverse belt grooves through open ends thereof to advance said belt longitudinally and thereby move successive slide-carrying pockets in front of said light source.

3. In a projector having a light source and having a transverse guideway in front of said light source, an elongated belt having a plurality of equally spaced slide receiving pockets slidably mounted in said guideway, a transverse shoulder on the inner side of said belt between each pair of pockets, a disc rotatably mounted adjacent the inner side of said belt and having an eccentric pin thereon engageable with successive shoulders of said belt to advance the latter and thereby move successive slide carrying pockets in front of said light source, means for driving said disc, a locking finger pivotally supported adjacent the inner side of said belt and having a latching projection thereon, means normally urging said latching projection toward the inner side of said belt to engage one of said shoulders, and cam means on said disc for maintaining said latching projection in a position clear of the shoulders on the belt while the belt is being moved by said drive pin.

4. In a projector having a light source and having a transverse guideway in front of said light source, an elongated belt having a plurality of equally spaced slide receiving pockets slidably mounted in said guideway, a transverse shoulder on the inner side of said belt between each pair of pockets, a disc rotatably mounted adjacent the inner side of said belt and having an eccentric pin thereon engageable with successive shoulders of said belt to advance the latter and thereby move successive slide carrying pockets in front of said light source, means for driving said disc, a locking finger pivotally supported adjacent the inner side of said belt and having a latching projection thereon, means normally urging said latching projection toward the inner side of said belt to engage one of said shoulders, and means operated in synchronism with said drive pin for maintaining said latching projection in a position clear of engagement with the shoulders on the belt while the belt is being moved by said drive pin.

5. In a projector having a light source and having a transverse guideway in front of said light source, an elongated belt having a plurality of equally spaced slide receiving pockets slidably mounted in said guideway, there being a groove on the inner side of said belt between each pair of pockets, means including a movable drive pin engageable with successive grooves of said belt to advance the latter and thereby move successive slide carrying pockets in front of said light source, a locking member movably supported adjacent the inner side of said belt and having a latching projection thereon, means normally urging said latching projection toward the inner side of said belt to engage one of said grooves, and means operated in synchronism with said movable drive pin for maintaining said latching projection in a position clear of the grooves on the belt while the belt is being moved by said drive pin.

References Cited in the file of this patent

UNITED STATES PATENTS

| | | |
|---|---|---|
| 1,028,692 | Dusseris et al. | June 4, 1912 |
| 1,072,861 | Koike | Sept. 9, 1913 |
| 1,226,177 | Billings | May 15, 1917 |
| 1,503,488 | Craver | Aug. 5, 1924 |
| 1,590,704 | Semelroth | June 29, 1926 |
| 1,650,657 | Schwanhausser | Nov. 29, 1927 |
| 2,196,918 | Hepworth et al. | Apr. 9, 1940 |
| 2,391,879 | Chambers | Jan. 1, 1946 |
| 2,563,893 | Waller et al. | Aug. 14, 1951 |
| 2,586,176 | Olsen | Feb. 19, 1952 |
| 2,704,486 | Wilson | Mar. 22, 1955 |